(12) United States Patent
Weissert et al.

(10) Patent No.: US 12,269,307 B2
(45) Date of Patent: Apr. 8, 2025

(54) LEAF SPRING DEVICE, CHASSIS AND VEHICLE

(71) Applicant: Rheinmetall Invent GmbH, Neuss (DE)

(72) Inventors: Martin Weissert, Nordheim (DE); Ingo Goutier, Bad Rappenau (DE)

(73) Assignee: Rheinmetall Invent GmbH, Neuss (DE)

( * ) Notice: Subject to any disclaimer, the term of this patent is extended or adjusted under 35 U.S.C. 154(b) by 0 days.

(21) Appl. No.: 18/281,376

(22) PCT Filed: Mar. 17, 2022

(86) PCT No.: PCT/EP2022/057033
§ 371 (c)(1),
(2) Date: Sep. 11, 2023

(87) PCT Pub. No.: WO2022/195030
PCT Pub. Date: Sep. 22, 2022

(65) Prior Publication Data
US 2024/0157744 A1      May 16, 2024

(30) Foreign Application Priority Data
Mar. 18, 2021   (DE) ..................... 10 2021 106 716.2

(51) Int. Cl.
*B60G 11/107*    (2006.01)
*B60G 7/00*      (2006.01)

(52) U.S. Cl.
CPC ............ *B60G 11/107* (2013.01); *B60G 7/001* (2013.01); *B60G 2202/117* (2013.01);
(Continued)

(58) Field of Classification Search
CPC .................. B60G 11/107; B60G 7/001; B60G 2202/117; B60G 2204/121; B60G 2204/416; B60G 2206/428
See application file for complete search history.

(56) References Cited

U.S. PATENT DOCUMENTS 1,623,844 A    4/1927   Kogstrom
1,731,765 A   10/1929   Coppock
(Continued)

FOREIGN PATENT DOCUMENTS

CN    1 09 398 015 A     3/2019
DE    1 226 435 A1      10/1966
(Continued)

OTHER PUBLICATIONS

International Search Report; European Patent Office, Jul. 21, 2022.

*Primary Examiner* — Faye M Fleming
(74) *Attorney, Agent, or Firm* — Caldwell Intellectual Property Law

(57) ABSTRACT

A leaf spring device for a vehicle, comprising a leaf spring apparatus made of a fiber composite plastic, a first bearing point provided at a first end section of the leaf spring apparatus for supporting the leaf spring device on the vehicle, the first bearing point comprising exactly three rotational degrees of freedom, and a second bearing point provided at a second end section of the leaf spring apparatus facing away from the first end section for supporting the leaf spring device on the vehicle, the second bearing point comprising exactly one rotational degree of freedom.

17 Claims, 7 Drawing Sheets

(52) U.S. Cl.
CPC .. *B60G 2204/121* (2013.01); *B60G 2204/416* (2013.01); *B60G 2206/428* (2013.01); *B60G 2206/7101* (2013.01)

(56) References Cited

U.S. PATENT DOCUMENTS

| | | | | |
|---|---|---|---|---|
| 6,220,580 | B1 * | 4/2001 | Balczun | B60G 11/113 267/7 |
| 8,444,163 | B2 * | 5/2013 | Fruhmann | F16F 1/3683 267/7 |
| 2008/0252023 | A1 | 10/2008 | Platner et al. | |

FOREIGN PATENT DOCUMENTS

| | | | |
|---|---|---|---|
| DE | 36 37 663 | A1 | 5/1987 |
| DE | 3701265 | A1 | 7/1988 |
| DE | 19704433 | A1 | 8/1998 |
| DE | 10 2006 055 483 | A1 | 5/2008 |
| DE | 10 2016 203 738 | A1 | 9/2017 |
| DE | 102016207631 | A1 * | 11/2017 |
| DE | 10 2016 220 325 | A1 | 4/2018 |
| DE | 10 2020 117 338 | B3 | 10/2021 |
| FR | 747 245 | A | 6/1933 |
| GB | 336777 | A | 10/1930 |
| JP | H02500535 | A | 2/1990 |
| JP | H05-8 625 | A | 1/1993 |
| JP | H0524421 | A | 2/1993 |
| JP | 4865889 | B2 | 2/2012 |
| JP | 2017009114 | A | 1/2017 |
| WO | 1985002207 | A1 | 5/1985 |

\* cited by examiner

… (1)

LEAF SPRING DEVICE, CHASSIS AND VEHICLE

CROSS-REFERENCE TO RELATED APPLICATIONS

This application is for entry into the U.S. National Phase from which priority is claimed under all applicable sections of Title 35 of the United States Code including, but not limited to, Sections 120, 363, and 365(c) to International Application Serial No. PCT/EP2022/057033, filed on Mar. 17, 2022 and entitled "LEAF SPRING APPARATUS, CHASSIS AND VEHICLE," which in turn claims priority to German Patent Application Serial No. DE 10 2021 106 716.2, filed on Mar. 18, 2021 and entitled "BLATTFEDER-VORRICHTUNG, FAHRWERK UND FAHRZEUG." Each of International Application Serial No. PCT/EP2022/057033 and German application Serial No. DE 10 2021 106 716.2 is incorporated by reference herein in its entirety.

FIELD OF THE INVENTION

The present invention relates to a leaf spring device for a vehicle, a chassis comprising such a leaf spring device, and a vehicle comprising such a leaf spring device and/or such a chassis.

BACKGROUND

In motor vehicles, springs may be provided in the chassis for spring supporting of the motor vehicle. Such springs are usually made of metal materials and are therefore heavy and susceptible to corrosion. Springs made of fiber composite plastics are lighter and less susceptible to corrosion but are more complex in terms of their design and manufacture. Due to their simpler design compared to steel coil springs, leaf springs made of fiber composite plastics in particular are increasingly displacing steel leaf springs in the automotive sector and represent a disruptive technology compared to steel leaf springs that can increasingly be established with mastered manufacturing processes.

The chassis of motor vehicles are designed in such a way that the respective wheel is not only displaced one-dimensionally in the vertical direction during compression and rebound. Depending on the complexity of the chassis, the wheel is moved in three spatial directions and also twisted slightly during compression. Steel springs are insensitive to movements that shift or twist their support points relative to the body when the wheel is compressed.

This does not apply to leaf springs made of fiber composite plastics. The previously mentioned support points move laterally in relation to each other and twist. This places great stress on leaf springs made of fiber composite plastics and can lead to breakage under certain circumstances. In the case of leaf springs made of fiber composite plastics, according to the applicant's internal knowledge, the procedure is therefore to combine two meander-shaped leaf springs, held together at their two ends by means of spring shoes, to form a leaf spring device. This two-part design is only necessary because the structure of the leaf springs tolerates only very small lateral deflections or very little torsion during compression. The reason for this is the unidirectional fiber structure of the fiber composite plastic, which offers little strength in the event of lateral displacement or torsion of the two support points relative to each other.

Against this background, one object of the present invention is to provide an improved leaf spring device for a vehicle.

SUMMARY OF THE DISCLOSURE

Accordingly, a leaf spring device for a vehicle is proposed. The leaf spring device comprises a leaf spring apparatus made of a fiber composite plastic, a first bearing point provided at a first end section of the leaf spring apparatus for supporting the leaf spring device on the vehicle, the first bearing point comprising exactly three rotational degrees of freedom, and a second bearing point provided at a second end section of the leaf spring apparatus facing away from the first end section for supporting the leaf spring device on the vehicle, the second bearing point comprising exactly one rotational degree of freedom.

The fact that the first bearing point has several rotational degrees of freedom means that it can prevent torsion and lateral forces from being introduced into the leaf spring apparatus. The fact that the second bearing point has only one rotational degree of freedom prevents unintentional twisting of the leaf spring apparatus. The fact that undesirable loads on the leaf spring apparatus can be prevented with the aid of the bearing points makes it possible to design the leaf spring apparatus with optimum weight and adapted to the application.

A "leaf spring apparatus" in the present context means a spring or spring element which is composed of a plurality of leaf spring elements or leaf spring sections which are connected to one another and thus preferably form a zigzag or meander-shaped geometry. The individual leaf spring sections may have a leaf-shaped or plate-shaped geometry. "Leaf-shaped" or "plate-shaped" does not, however, preclude the leaf spring sections from being curved or having any three-dimensional shape. For example, the leaf spring sections may be curved in an S-shape when viewed from the side. In contrast to the leaf spring apparatus, a cylindrical spring or coil spring has a continuous wire that is helically shaped such that the coil spring has a cylindrical geometry.

The leaf spring apparatus is preferably a compression spring. However, the leaf spring apparatus can also be a tension spring. The leaf spring device differs from the leaf spring apparatus in that the leaf spring device comprises both the leaf spring apparatus and the bearing points. That is, the leaf spring apparatus and the bearing points are part of the leaf spring device. The bearing points, on the other hand, are not part of the leaf spring apparatus. However, this does not preclude the bearing points from being attached or secured to the leaf spring apparatus. The leaf spring device preferably comprises exactly one leaf spring apparatus.

The fiber composite plastic (FCP) can also be referred to as fiber-reinforced plastic material. The fiber composite plastic comprises a plastic material, in particular a plastic matrix, in which fibers, for example natural fibers, glass fibers, carbon fibers, aramid fibers or the like, are embedded. The plastic material may be a thermoset, such as an epoxy resin, or a vinyl ester-based resin. However, the plastic material may also be a thermoplastic. The fibers may be continuous fibers. In particular, the fibers may be so-called unidirectional fibers. That is, the fibers all run parallel to each other.

However, the fibers can also be short or medium-length fibers, which can have a fiber length of several millimeters to several centimeters. The fibers can be arranged directionally or non-directionally in the plastic material. Particularly preferably, the fibers are arranged directionally in the plastic material. In particular, this means that the fibers are embedded in the plastic material parallel to one another and evenly spaced apart. The leaf spring apparatus may have a layered or laminated structure. For this purpose, for example, layers of fiber fabric or fiber scrim are impregnated with the plastic material. Alternatively, however, so-called prepregs, i.e. pre-impregnated fibers, fiber fabrics or fiber scrims, can also be used to manufacture the leaf spring apparatus.

The leaf spring apparatus preferably extends as a continuous band from the first end section to the second end section or, conversely, from the second end section to the first end section. Accordingly, an "end section" in the present context means a region of the leaf spring apparatus at which the leaf spring apparatus ends. The fact that the second end section "faces away" from the first end section means in particular in the present case that the first end section and the second end section, viewed along the leaf spring apparatus, are at a maximum possible distance from one another. That the bearing points are "provided" at the end sections means in particular that the bearing points are arranged or attached to the end sections. "Provided" may thereby also comprise fixedly or detachably connected.

A "rotational degree of freedom" in this context means a rotational movement of the leaf spring apparatus about an axis with the aid of the respective bearing point. The first bearing point allows a rotational movement around three axes.

In contrast, the second bearing point allows a rotational movement about exactly one axis. Exactly one rotational degree of freedom of the second bearing point can be identical to one of the three rotational degrees of freedom of the first bearing point. However, this is not absolutely necessary. In particular, this means that the exactly one rotational degree of freedom of the second bearing point can also be different from the three rotational degrees of freedom of the first bearing point. Preferably, none of the bearing points has a linear or translational degree of freedom.

According to an embodiment, the first bearing point includes one rotational degree of freedom about a vertical direction of the leaf spring apparatus, one rotational degree of freedom about a transverse direction of the leaf spring apparatus, and one rotational degree of freedom about a depth direction of the leaf spring apparatus, wherein the vertical direction, the transverse direction, and the depth direction are oriented perpendicular to each other.

The transverse direction may also be referred to as the x-direction, the vertical direction may also be referred to as the y-direction, and the depth direction may also be referred to as the z-direction. The transverse direction, the vertical direction and the depth direction form a coordinate system of the leaf spring apparatus and the leaf spring device, respectively. The vertical direction is oriented in particular from the second end section in the direction of the first end section, respectively along a main extension direction of the leaf spring apparatus. The transverse direction preferably extends along a widthwise extension of the leaf spring apparatus. Along the depth direction, the previously mentioned leaf spring sections preferably extend.

According to another embodiment, the exactly one rotational degree of freedom of the second bearing point is oriented about an rotation axis arranged perpendicularly or obliquely to the vertical direction.

Depending on a deflection path of the leaf spring device, an inclination angle between the rotation axis and the vertical direction changes. In the case where the rotation axis is arranged perpendicular to the vertical direction, the rotation axis may be oriented parallel to or coincide with the depth direction.

According to another embodiment, the first bearing point is a ball head of a ball joint.

The first bearing point can therefore also be referred to as the ball head. This means that the terms "first bearing point" and "ball head" can be interchanged as desired. Preferably, the first bearing point has a hemispherical geometry. The ball joint can be part of the leaf spring device. However, this is not absolutely necessary. Alternatively, the first bearing point can also be, for example, a pin, a point or a mandrel, which allows three rotational degrees of freedom. The first bearing point can also be a pin. In the present context, a "pin" is to be understood as a pin-shaped or bolt-shaped component. In the event that the first bearing point is a pin, a point, a mandrel or a pin, a funnel-shaped or cone-shaped receptacle in which the pin, the point, the mandrel or the pin is seated is preferably provided as a counterpart. Furthermore, the first bearing point can also be a ball socket. In this case, a ball head is provided as a corresponding counterpart to the first bearing point. Particularly preferably, however, the first bearing point is a ball head.

According to another embodiment, the leaf spring device comprises a ball socket of the ball joint, wherein the first bearing point is at least partially received in the ball socket.

Alternatively, the ball socket can also be part of a body of the vehicle or be attached to the body. A sealing element, in particular in the form of an O-ring or a bellows, can be provided between a base section of a first spring shoe provided on the first end section of the leaf spring apparatus and the ball socket. The sealing element prevents a lubricant from leaking out of the ball head and dirt from entering the ball head.

According to another embodiment, the first bearing point and/or the ball socket is plastic-coated, in particular coated with polytetrafluoroethylene.

The plastic coating can in particular reduce the friction between the first bearing point and the ball socket. This further reduces the risk of torsional loading of the leaf spring apparatus. Furthermore, a lubricant can also be provided between the first bearing point and the ball socket.

According to another embodiment, the second bearing point has a cylindrical geometry.

In particular, the second bearing point has a semi-cylindrical geometry, which is at least partially rotationally symmetrical to the rotation axis of the second bearing point. Alternatively, the second bearing point can also have a V-shaped geometry. The second bearing point may also be a pin or the like that allows movement about the rotation axis. The second bearing point may also have a blade-shaped geometry. In this case, a notch, groove, or the like is preferably provided as a counter bearing.

According to another embodiment, the leaf spring device comprises a first spring shoe attached to the first end section and comprising the first bearing point, and a second spring shoe attached to the second end section that comprises the second bearing point.

The spring shoes are firmly connected to the respective end section. For example, the spring shoes are glued, clamped, screwed, or otherwise firmly connected to the respective end section. For example, the spring shoes may be made of a metallic material, such as an aluminum alloy or a steel alloy. Alternatively, the spring shoes may be made of a fiber composite plastic. Each spring shoe preferably has a plate-shaped base section, which is fixedly connected to the respective end section. The first bearing point, which is preferably in the form of a ball head, extends out of the base section of the first spring shoe. The second bearing point, which is preferably designed as a cylindrical geometry, extends out of the base section of the second spring shoe.

According to another embodiment, the leaf spring apparatus is an integral component.

"Integral" or "one-piece" means in the present case that the leaf spring apparatus forms one component and is not composed of different components. In particular, the leaf spring apparatus can be a one-piece of material component. "One-piece of material" means in particular in the present case that the leaf spring apparatus is made throughout from the same material, namely from the fiber composite plastic. However, this does not preclude the fiber composite plastic itself from being composed of different materials, namely the plastic matrix and the fibers embedded therein. Alternatively, the leaf spring apparatus may be multi-part. In this case, the leaf spring apparatus is composed of a plurality of components, for example a plurality of leaf spring sections, which are joined together in a suitable manner. For example, the leaf spring apparatus may comprise two parallel spring strands.

According to another embodiment, the leaf spring apparatus comprises a plurality of leaf spring sections and a plurality of deflection sections, in each case one deflection section connecting two adjacent leaf spring sections to one another.

Thus, the leaf spring sections and the deflection sections are arranged alternately in such a way that a deflection section is arranged between two leaf spring sections and a leaf spring section is arranged between two deflection sections. The leaf spring sections preferably have an S-shaped geometry in cross section. The leaf spring sections and the deflection sections are arranged in such a way that the leaf spring apparatus has the previously mentioned zigzag or meander geometry. The leaf spring sections may be integrally connected to one another, in particular integrally made of material, by means of the deflection sections. Preferably, the deflection sections have greater rigidity than the leaf spring sections. This can be achieved, for example, by the deflection sections having a larger cross-sectional area than the leaf spring sections. The larger cross-sectional area can be achieved by stiffening cores or stiffening elements. This ensures that when the leaf spring apparatus compresses, it is essentially the leaf spring sections and not the deflection sections that deform elastically. The deflection sections thus form deactivated zones of the leaf spring apparatus or can be designated as such.

Furthermore, an alternative leaf spring device for a vehicle is proposed. The alternative leaf spring device comprises a leaf spring apparatus made of a fiber composite plastic, a first bearing point provided at a first end section of the leaf spring apparatus for supporting the leaf spring device on the vehicle, the first bearing point comprising exactly three rotational degrees of freedom, and a second bearing point provided at a second end section of the leaf spring apparatus facing away from the first end section for supporting the leaf spring device on the vehicle, the second bearing point comprising more than one rotational degree of freedom.

For example, the second bearing point also has exactly three rotational degrees of freedom. In this case, both the first bearing point and the second bearing point can each be a ball head of a ball joint, a pin, spike, pin, or the like, which allows three rotational degrees of freedom at each bearing point. Undesirable rotation of the leaf spring device can then be prevented by suitable measures, if necessary. For example, the leaf spring device can be tied to the body by means of a damper, in particular a rubber damper, so that it cannot twist. However, this is not absolutely necessary.

Furthermore, a chassis for a vehicle is proposed. The chassis comprises at least one leaf spring device as previously explained, a body connection area provided on the vehicle on which the first bearing point is supported, and a control arm comprising a control arm connection area on which the second bearing point is supported.

Preferably, the chassis comprises a plurality of leaf spring devices. For example, the chassis may comprise four leaf spring devices, each leaf spring device being associated with a wheel of the vehicle. The control arm may be connected to the respective wheel by means of a wheel carrier. Each wheel may have two such control arms associated therewith, which are placed one above the other as viewed in the vertical direction. The body connection area may be provided on a body of the vehicle. However, this is not mandatory. The body connection area can also be part of the chassis. The control arm connection area is provided on the control arm. The body connection area may comprise the previously mentioned ball socket. For example, the ball socket may be bolted to the body connection area. The control arm connection area may, for example, have a groove-shaped geometry or a flat bearing surface on or against which the cylindrically shaped second bearing point is mounted in such a way that it can tilt by exactly one rotational degree of freedom relative to the control arm connection area. The second bearing point can also be hinge-shaped. For example, the bearing point has a pin or is pin-shaped. In this case, the pin may be rotatably mounted to the control arm connection area. However, the leaf spring device can also be used on twist beam axles without a control arm linkage. In this case, the end sections of the leaf spring apparatus move along a circular path when the suspension is compressed, and the entire vehicle axle is displaced relative to the body by special bearing points when the vehicle is cornered. Any other wheel suspension systems are conceivable for which the leaf spring device is also suitable.

According to an embodiment, the first bearing point is arranged above the second bearing point with respect to a direction of gravity.

Alternatively, the second bearing point can also be arranged above the first bearing point with respect to the direction of gravity. In this case, the first bearing point is mounted on the control arm connection area, and the second bearing point is mounted on the body connection area.

According to another embodiment, the control arm can be brought from a sprung-out state to a sprung-in state and vice versa, the control arm connection area tilting by a tilt angle when the control arm is brought from the sprung-out state to the sprung-in state, and the first bearing point compensating the tilt angle.

In particular, the control arm connection area tilts about the vertical axis by the tilt angle. At the same time, the rotation axis of the second bearing point also tilts about the tilt angle in the vertical direction. The fact that the first bearing point "compensates" the tilt angle means in this case that the first bearing point rotates about the tilt angle relative to the body connection area. The tilting of the control arm connection area is therefore not introduced into the leaf spring apparatus, so that it is not subject to any torsional load.

According to another embodiment, the control arm connection area moves by an offset when the control arm is moved from the sprung-out state to the sprung-in state, the second bearing location compensating the offset.

The second bearing point compensates the offset by tilting the leaf spring device about the rotation axis of the second bearing point. At the same time, the first bearing point also tilts relative to the body connection area. This means that the first bearing point also compensates the offset. The offset results from the geometry of the control arm, which, when the latter is moved from the sprung-out to the sprung-in state, not only moves upwards along the vertical direction, but also moves forwards or backwards along a direction of travel or along the transverse direction, respectively. In the present context, "offset" is to be understood as a movement of the control arm connection area in or against a direction of travel of the vehicle.

Further, a vehicle having such a leaf spring device and/or chassis is proposed.

The vehicle may include multiple leaf spring devices. For example, the vehicle includes four such leaf spring devices. Preferably, the vehicle is a motor vehicle. In particular, the vehicle may be an electric vehicle or hybrid vehicle. However, the vehicle may also comprise an internal combustion engine. The vehicle may also be a commercial vehicle, such as a truck. Further, the vehicle may also be an aircraft, a watercraft, or a rail vehicle.

The embodiments and features described for the proposed leaf spring device apply mutatis mutandis to the proposed chassis and/or vehicle, and vice versa.

In the present context, "one" is not necessarily to be understood as being limited to exactly one element. Rather, several elements, such as two, three or more, may also be provided. Also, any other counting word used herein is not to be understood as limiting to exactly the number of elements mentioned. Rather, numerical deviations upwards and downwards are possible, unless otherwise indicated.

Further possible implementations of the leaf spring device, the chassis and/or the vehicle also include combinations of features and embodiments described previously or below with respect to the embodiment examples that are not explicitly mentioned. In this context, the skilled person will also add individual aspects as improvements or additions to the respective basic form of the leaf spring device, the chassis and/or the vehicle.

Further advantageous embodiments and aspects of the leaf spring device, the chassis and/or the vehicle are the subject of the subclaims as well as the embodiments of the leaf spring device, the chassis and/or the vehicle described below. Furthermore, the leaf spring device, the chassis and/or the vehicle are explained in more detail on the basis of preferred embodiments with reference to the accompanying figures.

BRIEF DESCRIPTION OF THE DRAWINGS

In the figures, identical or functionally identical elements have been given the same reference signs unless otherwise indicated.

DETAILED DESCRIPTION

Figure 1:
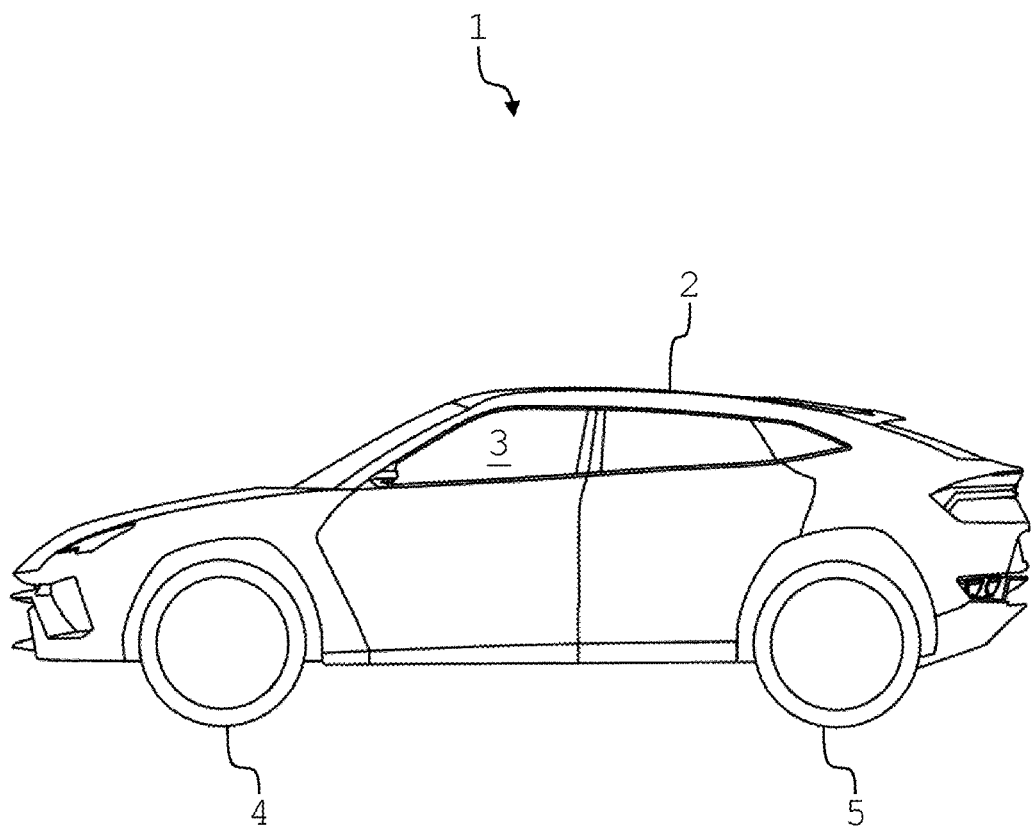
FIG. 1 shows a schematic view of an embodiment of a vehicle.

FIG. 1 shows a schematic view of an embodiment of a vehicle 1. The vehicle 1 is a motor vehicle, in particular an electric vehicle or hybrid vehicle. However, the vehicle 1 may also be powered purely by an internal combustion engine. The vehicle 1 may also be a commercial vehicle, for example a truck or a construction machine. Furthermore, the vehicle 1 may also be an aircraft, a watercraft, or a rail vehicle. In the following, however, it is assumed that the vehicle 1 is a motor vehicle, in particular a passenger car.

The vehicle 1 includes a body 2 that encloses a passenger compartment or vehicle interior 3 of the vehicle 1. The vehicle interior 3 may contain a driver and passengers. The vehicle 1 comprises a chassis having a plurality of wheels 4, 5. The number of wheels 4, 5 is basically arbitrary. Preferably, the vehicle 1 comprises four wheels 4, 5. The wheels 4, 5 are part of a chassis of the vehicle 1.

Figure 2:
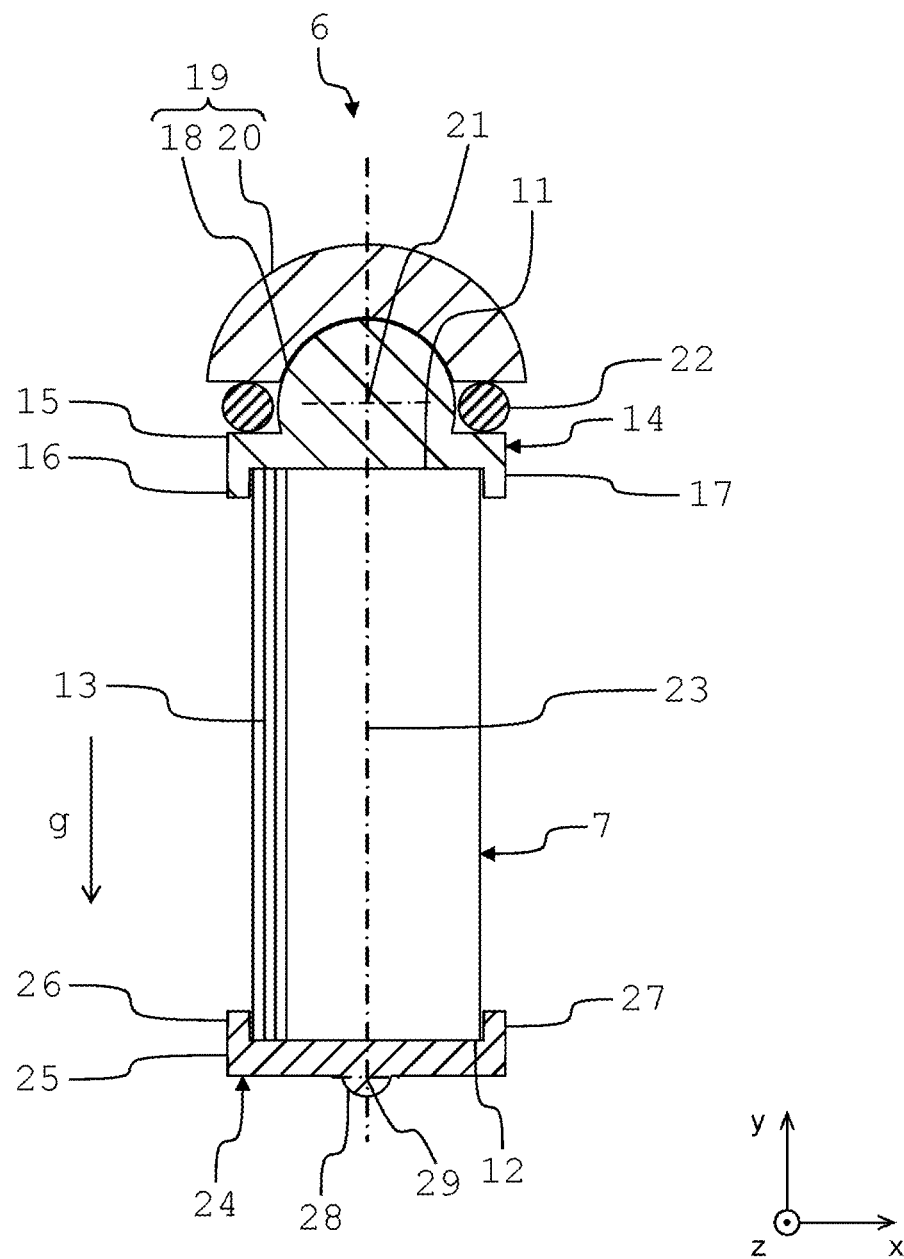
FIG. 2 shows a schematic view of an embodiment of a leaf spring device for the vehicle according to FIG. 1.
Figure 3:
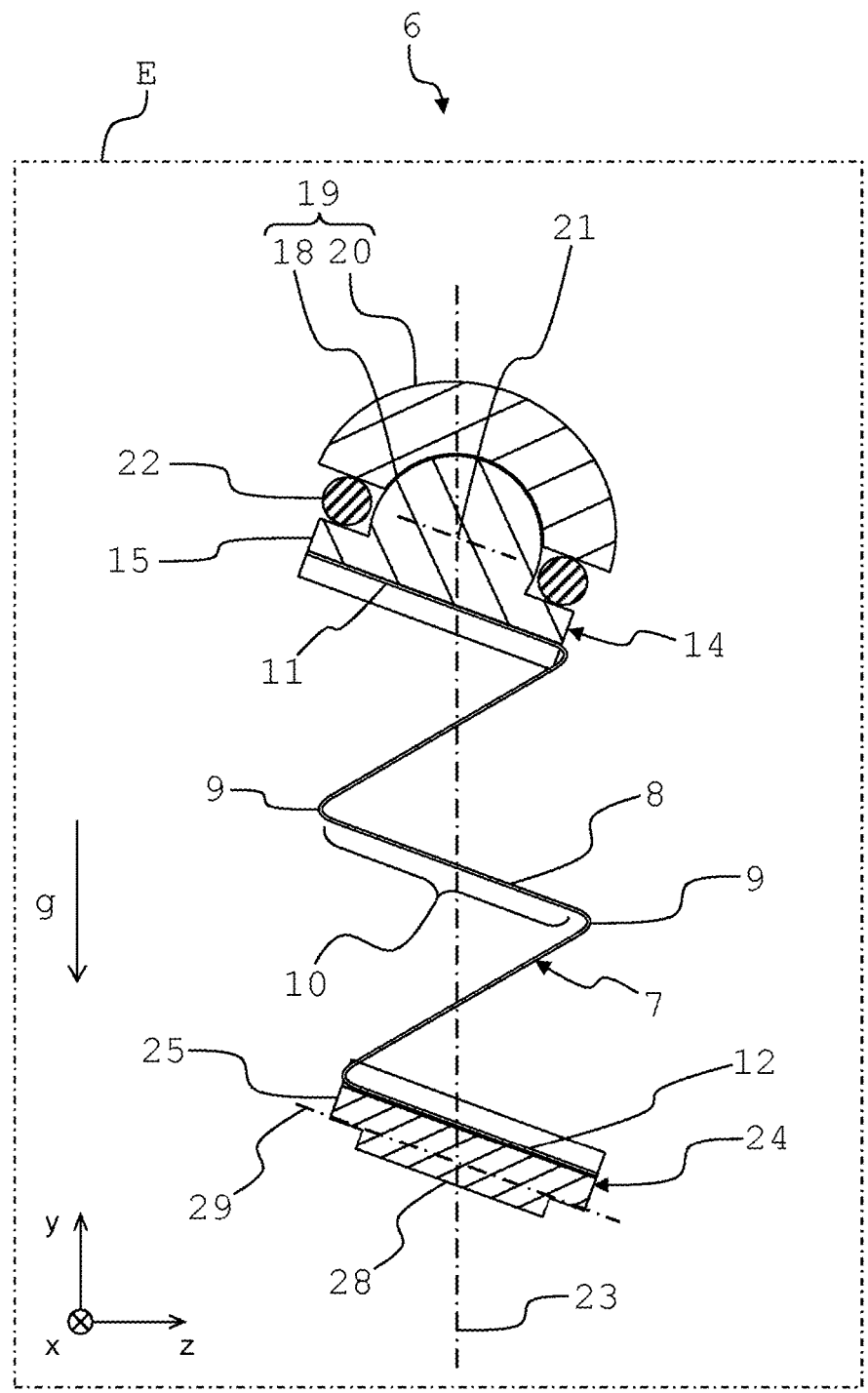
FIG. 3 shows another schematic view of the leaf spring device according to FIG. 2.

FIGS. 2 and 3 each show a schematic view of an embodiment of a leaf spring device 6. The leaf spring device 6 is suitable for use in or on the vehicle 1. The leaf spring device 6 may find application in the region of a wheel suspension of the vehicle 1. The vehicle 1 may have any number of leaf spring devices 6. For example, each of the wheels 4, 5 may have such a leaf spring device 6 associated therewith.

The leaf spring device 6 comprises a leaf spring apparatus 7. In particular, the leaf spring device 6 comprises exactly one leaf spring apparatus 7. The leaf spring apparatus 7 is made of a fiber-reinforced plastic material or a fiber composite plastic (FCP). The fiber composite plastic comprises a plastic material, in particular a plastic matrix, in which fibers, for example natural fibers, glass fibers, carbon fibers, aramid fibers or the like, are embedded. The plastic material may be a thermoset, such as an epoxy resin or a vinyl ester-based resin. However, the plastic material may also be a thermoplastic.

The fibers can be continuous fibers. However, the fibers may also be short or medium-length fibers, which may have a fiber length of a few millimeters to a few centimeters. The leaf spring apparatus 7 can have a layered or laminated structure. For this purpose, for example, layers of fiber fabric or fiber scrim are impregnated with the plastic matrix. Alternatively, however, so-called prepregs, i.e. pre-impregnated fibers, fiber fabrics or fiber scrims, can also be used to manufacture the leaf spring apparatus 7.

The leaf spring apparatus 7 has a meandering or zigzag geometry. The leaf spring apparatus 7 has a plurality of leaf spring sections 8 which are connected to one another at deflection sections 9. The number of leaf spring sections 8 is arbitrary. Likewise, the number of deflection sections 9 is arbitrary. The leaf spring sections 8 and the deflection sections 9 are arranged alternately, so that a deflection section 9 is always arranged between two leaf spring sections 8 and a leaf spring section 8 is always arranged between two deflection sections 9. The individual leaf spring sections 8 preferably each have an S-shaped geometry or have an S-shaped course in the side view (not shown).

The leaf spring sections 8 can be connected to each other integrally, in particular in one piece of material, with the aid of the deflection sections 9. "Integral" or "one-piece" means in the present case that the leaf spring sections 8 and the deflection sections 9 form a common component and are not composed of different components. "One-piece of material" means in particular in the present case that the leaf spring sections 8 and the deflection sections 9 are manufactured throughout from the same material, namely from the fiber composite plastic.

The leaf spring sections 8 and the deflection sections 9 are designed in such a way that, when the leaf spring apparatus 7 is loaded, no deformation or at least no appreciable deformation takes place in the deflection sections 9. For this purpose, the deflection sections 9 have a greater stiffness than the leaf spring sections 8. In the present context, "stiffness" is to be understood quite generally as the resistance of a body to elastic deformation by a force or moment. The stiffness depends on the geometry of the body and the material used. The stiffness of the deflection sections 9 can be increased compared to the leaf spring sections 8 by providing stiffening elements or stiffening cores in or on the deflection sections 9. The stiffening cores can be integrated into the deflection sections 9 so that they are surrounded by the fiber composite plastic. The deflection sections 9 thus form inactive or inactivated areas or zones of the leaf spring apparatus 7. The leaf spring sections 8, on the other hand, are each elastically deformed in a central area 10 and generate a spring force counteracting a load acting from outside.

The leaf spring apparatus 7 comprises a first end section 11 and a second end section 12. The leaf spring apparatus 7 is band-shaped and extends continuously from the first end section 11 to the second end section 12. As mentioned before, fibers 13 of the fiber composite plastic of the leaf spring apparatus 7 extend from the first end section 11 to the second end section 12 or vice versa. However, it is not mandatory that the fibers 13 extend continuously from the first end section 11 to the second end section 12. In particular, the fibers 13 are unidirectional fibers.

The end sections 11, 12 are provided at the ends of the leaf spring apparatus 7. Viewed with respect to a direction of gravity g, the first end section 11 can be placed above the second end section 12. However, the leaf spring apparatus 7 can also be arranged in such a way that the first end section 11 is arranged below the second end section 12 with respect to the direction of gravity g. The end sections 11, 12 can be end-side leaf spring sections 8 of the leaf spring apparatus 7. In the present case, "end-side" means that the end sections 11, 12 are each no longer adjoined by a deflection section 9.

A first spring shoe 14 is attached to the first end section 11. The first spring shoe 14 may be bonded, clamped, screwed, or otherwise fixedly connected to the first end section 11. The first spring shoe 14 may be made of a metallic material. Alternatively, the first spring shoe 14 may be made of a fiber composite plastic. The first spring shoe 14 includes a plate-shaped base section 15 that is fixedly connected to the first end section 11. The base section 15 may be plate-shaped, for example, and comprises two lateral arms 16, 17 between which the first end section 11 is arranged.

The first spring shoe 14 includes a first bearing point 18. The first bearing point 18 is a ball head of a ball joint 19. The first bearing point 18 may also be referred to as a ball head. That is, the terms "first bearing point" and "ball head" can be used interchangeably as desired. In particular, the first bearing point 18 has a hemispherical geometry. However, this is not absolutely necessary. The first bearing point 18 can also be a mandrel or thorn-shaped.

In addition to the first bearing point 18, the ball joint 19 includes a ball socket 20. The first bearing point 18 and the ball socket 20 have a common center point 21. The entire ball joint 19 may be part of the leaf spring device 6. In the event that the first bearing point 18 is a ball head, this is accommodated at least in sections in the ball socket 20. The first bearing point 18 in the form of the ball head and/or the ball socket 20 may be coated with a coating that improves sliding, in particular a plastic coating, preferably a polytetrafluoroethylene coating. A sealing element 22, for example in the form of an O-ring or a bellows, may be provided between the base section 15 of the first spring shoe 14 and the ball socket 20. The sealing element 22 prevents, for example, a lubricant from leaking out of the ball joint 19 or dirt from entering the ball joint 19.

The first bearing point 18 has exactly three rotational degrees of freedom. The leaf spring apparatus 7 or the leaf spring device 6 is assigned an x-direction or transverse direction x, a y-direction or vertical direction y, and a z-direction or depth direction z. The directions x, y, z are oriented perpendicular to each other. The directions x, y, z are oriented perpendicular to each other. The transverse direction x is thereby oriented from a first arm 16 toward a second arm 17 of the base section 15 of the first spring shoe 14. A width extension of the leaf spring apparatus 7 also extends in the transverse direction x. The vertical direction y is oriented from the second end section 12 toward the first end section 11. The depth direction z is oriented perpendicular to the transverse direction x and the vertical direction y. The vertical direction y and the depth direction z span a plane E shown in FIG. 3.

The first bearing point 18 now allows a rotational degree of freedom about the vertical direction y, in particular about a rotation axis 23, as well as one rotational degree of freedom each about the transverse direction x and about the depth direction z. A translational or linear movement of the first bearing point 18 is not possible. That is, the ball joint 19 blocks a linear movement of the first bearing point 18 in each direction x, y, z. The rotation axis 23 lies in the plane E. The center point 21 also lies in the plane E.

A second spring shoe 24 is attached to the second end section 12 of the leaf spring apparatus 7. The second spring shoe 24 may be made of a metallic material, such as a steel alloy or an aluminum alloy. However, the second spring shoe 24 may also be made of a fiber composite plastic. The second spring shoe 24 may be bonded to or otherwise fixedly connected to the second end section 12, for example. The second spring shoe 24 includes a plate-shaped base section 25 having two lateral arms 26, 27 between which the second end section 12 is disposed. The base section 25 may, for example, be bonded to the second end section 12.

A second bearing point 28 is provided on the second spring shoe 24. The second bearing point 28 can be designed as a cylindrical, in particular as a semi-cylindrical body, which extends out of the base section 25 on the underside, i.e. facing away from the second end section 12. Deviating therefrom, the second bearing point 28 may also have only a V-shaped or a blade-shaped geometry.

In the event that the second bearing point 28 is of cylindrical design, it may be of rotationally symmetrical design with respect to a rotation axis 29. Depending on the deformation state of the leaf spring apparatus 7, the rotation axis 29 is arranged either obliquely to the vertical direction y or perpendicularly thereto. In the case where the rotation axis 29 is oriented perpendicular to the vertical direction y, it is oriented parallel to the depth direction z. However, the position of the rotation axis 29 changes depending on the deformation state of the leaf spring apparatus 7. The second bearing point 28 has only one rotational degree of freedom, namely about the rotation axis 29. Preferably, the second bearing point 28 does not have any further degrees of freedom. The rotation axis 29 lies in the plane E. Here, the rotation axis 23 and the rotation axis 29 can intersect. Preferably, the rotation axis 29 is placed at an angle to the rotation axis 23.

In a further development of the leaf spring device 6, however, the second bearing point 28 can also have several degrees of freedom. For this purpose, the second bearing point 28 can, for example, also have a ball head as explained above. In this case, undesirable twisting of the leaf spring device 6 can then be prevented, for example, by other suitable measures. Particularly preferably, however, the second bearing point 28 has only one degree of freedom.

The leaf spring device 6 differs from the leaf spring apparatus 7 in that the leaf spring device 6 has, in addition to the leaf spring apparatus 7, the spring shoes 14, 24 with the bearing points 18, 28. The spring shoes 14, 24, on the other hand, are not part of the leaf spring apparatus 7. However, this does not preclude the spring shoes 14, 24 from being firmly, in particular non-detachably, connected to the leaf spring apparatus 7.

Figure 4:
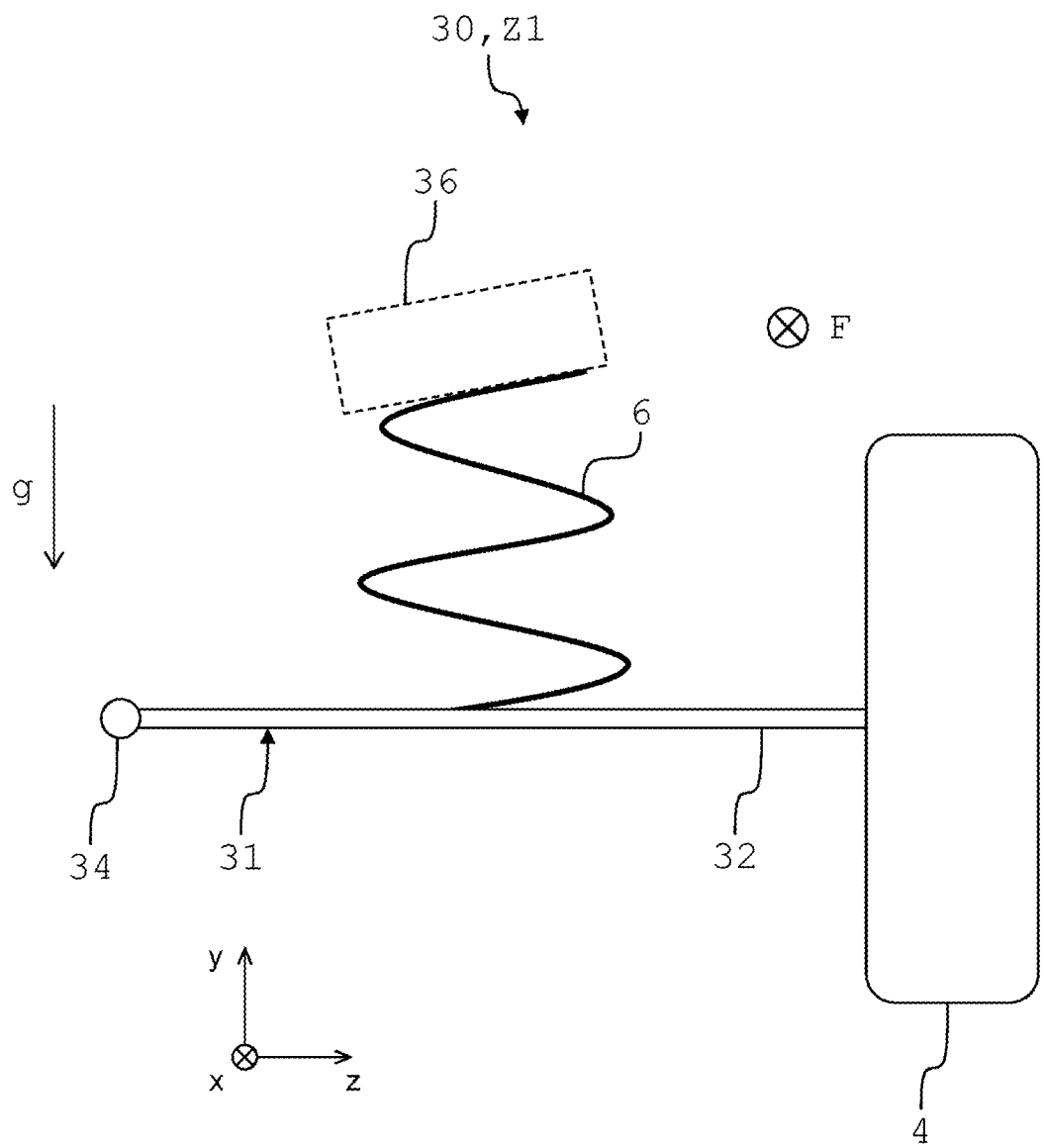
FIG. 4 shows a schematic rear view of an embodiment of a chassis for the vehicle according to FIG. 1.
Figure 5:
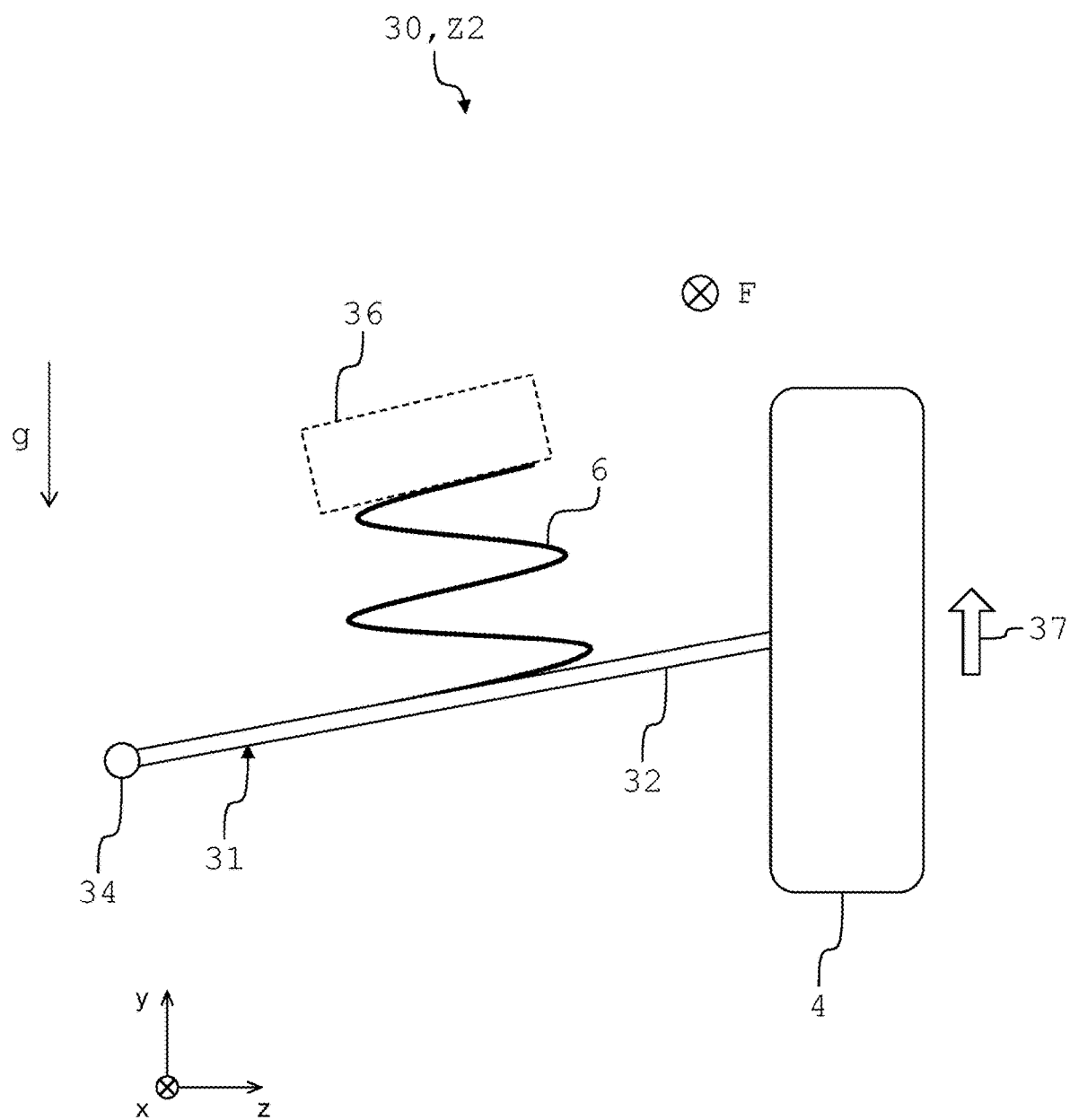
FIG. 5 shows another schematic rear view of the undercarriage according to FIG. 4.
Figure 6:
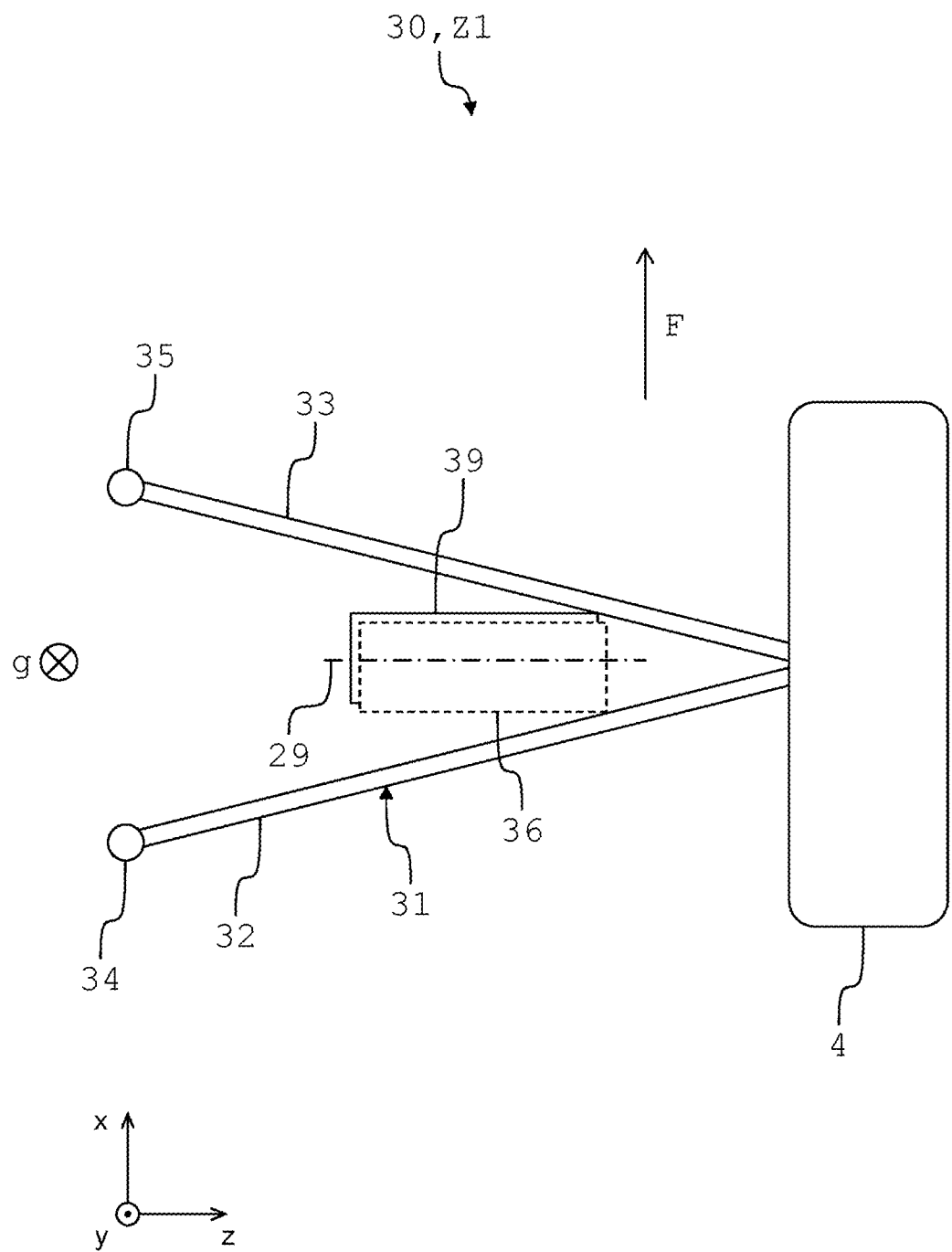
FIG. 6 shows a schematic top view of the chassis according to FIG. 4.
Figure 7:
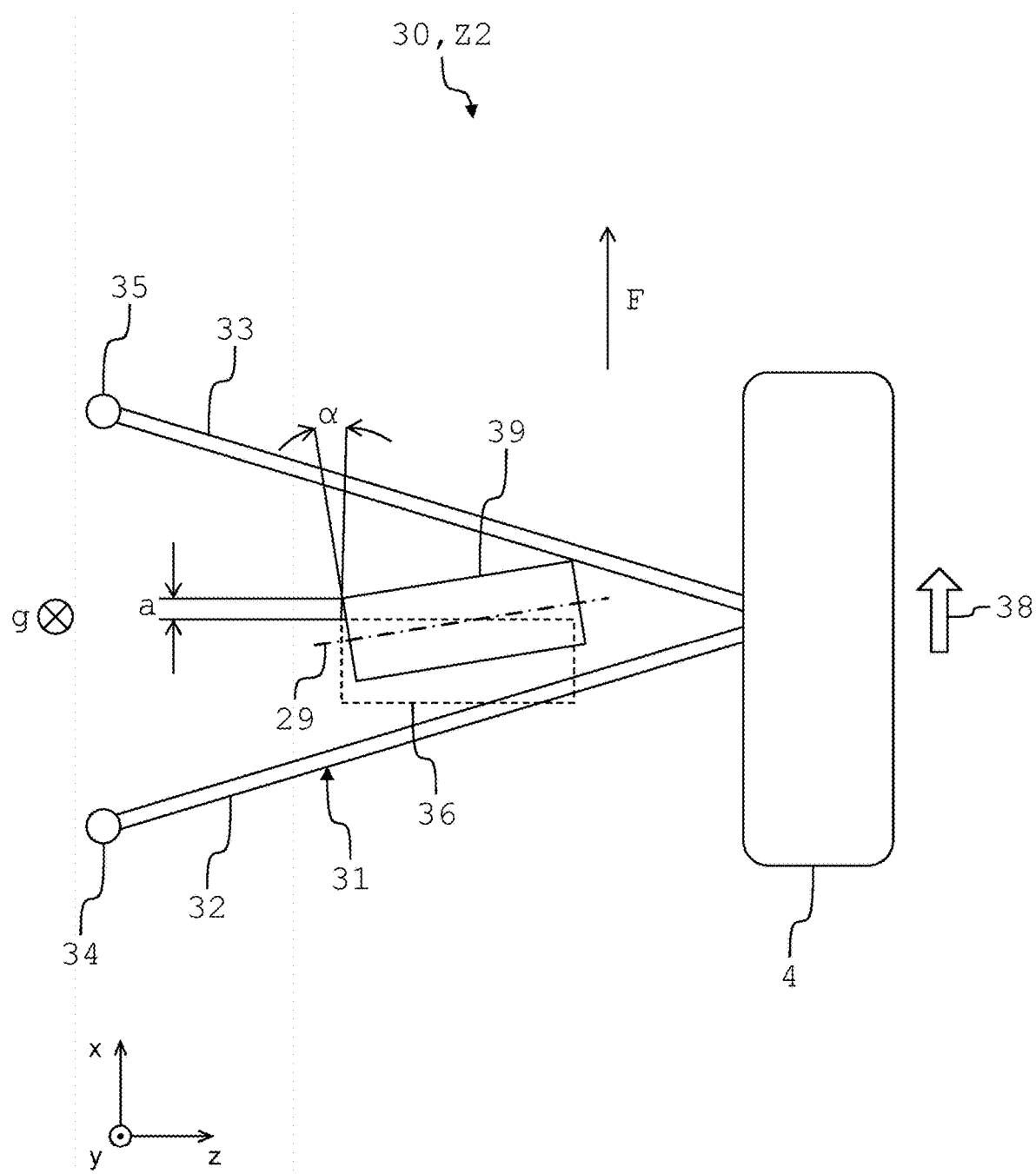
FIG. 7 shows another schematic top view of the chassis according to FIG. 4.

FIG. 4 shows a schematic rear view of an embodiment of a chassis 30 of the vehicle 1 in a sprung-out state Z1. FIG. 5 shows another schematic rear view of the chassis 30 in a sprung-in state Z2. FIG. 6 shows a schematic top view of the chassis 30 in the sprung-out state Z1. FIG. 7 shows a further schematic top view of the chassis 30 in the sprung-in state Z2. In FIGS. 4 and 5, the leaf spring device 6 is shown only in very schematic form. In FIGS. 6 and 7, the leaf spring device 6 is not shown at all. For explanation of the function of the leaf spring device 6, reference is made below to FIGS. 4 to 7 simultaneously.

In addition to the wheel 4, the chassis 30 comprises a control arm 31. The control arm 31 may be connected to the wheel 4 via a wheel carrier that is not shown. The control arm 31 may comprise two struts 32, 33 arranged in a V-shape. The struts 32, 33 are movably connected to a chassis of the vehicle 1, which is not shown, via attachment points 34, 35. In this case, the attachment points 34, 35 allow the control arm 31 to be pivoted about the transverse direction x. Deviating from FIGS. 4 and 5, instead of one control arm 31, two control arms 31 placed one above the other in the vertical direction y can be provided. A direction of travel F of the vehicle 1 is oriented along the transverse direction x.

The first bearing point 18 is connected to a body connection area 36. For example, the ball socket 20 is fixedly connected to the body connection area 36, for example screwed thereto. The body connection area 36 may be part of the body 2. When the chassis 30 is moved from the sprung-out state Z1 shown in FIGS. 4 and 6 to the sprung-in state Z2 shown in FIGS. 5 and 7, the wheel 4 moves upward along the vertical direction y, as indicated by an arrow 37 in FIG. 5. At the same time, however, due to the geometry of the control arm 31, the wheel 4 also moves along the transverse direction x, for example forward, as indicated by an arrow 38 in FIG. 7. The movement of the wheel 4 is basically dependent on the geometry of the chassis 30, in particular of the control arm 31.

This movement of the wheel 4 along the transverse direction x causes a control arm connection area 39 provided on the control arm 31 of the second bearing point 28 to move forward by an offset a along the transverse direction x compared to the sprung-out state Z1 (FIG. 6). At the same time, the control arm connection area 39 tilts together with the rotation axis 29 of the second bearing point 28 about the vertical direction y by a tilt angle α. Furthermore, tilting also takes place about the transverse direction x.

Now, in order to prevent an undesirable torsional load on the leaf spring apparatus 7 due to the tilting of the control arm connection area 39 about the vertical direction y, the first bearing point 18 can be used to compensate for the tilting angle α in such a way that the first bearing point 18 rotates by the tilting angle α relative to the ball socket 20. The offset a can be compensated for, firstly, by the first bearing point 18 also having a rotational degree of freedom about the depth direction z and, secondly, by the second bearing point 28 allowing the second spring shoe 24 to tilt about the rotation axis 29.

It is thus possible to protect the leaf spring apparatus 7 from torsional loading or transverse distortion. A load and a spring effect are preferably applied essentially only along the vertical direction y and along the rotation axis 23, respectively. It is thus possible to decouple and eliminate unnecessary load cases that are detrimental to the fiber composite plastic. This results in optimum usability of the properties of fiber composite plastics. The leaf spring device 6 can be manufactured with reduced weight. The properties of anisotropic materials, in particular fiber composite plastic, can be optimally utilized for the spring concept.

The leaf spring apparatus 7 can be designed integrally. This results in a significant cost saving. Alternatively, however, the leaf spring apparatus 7 can also be made in several parts. A further design optimization can be carried out, resulting in a higher lightweight effect. This results from the fact that a load-optimized design of the leaf spring device 6 is possible and thus unnecessary load cases do not have to be taken into account and unnecessarily designed out. The spring shoes 14, 24 can also be designed to be lighter. The lower weight of the leaf spring device 6 can also result in a faster reaction movement of the chassis 30 into the optimum chassis position for the respective driving situation. This results in better driving dynamics and increased safety.

Although the present invention has been described with reference to examples of embodiments, it can be modified in a variety of ways.

LIST OF REFERENCE SIGNS

1 Vehicle
2 Body
3 Vehicle interior
4 Wheel
5 Wheel
6 Leaf spring device
7 Leaf spring apparatus
8 Leaf spring section
9 Deflection section
10 Area
11 End section
12 End section
13 Fiber
14 Spring shoe
15 Base section
16 Arm
17 Arm
18 Bearing point
19 Ball joint
20 Ball socket
21 Center point
22 Sealing element
23 Rotation axis
24 Spring shoe 25 Base section
26 Arm
27 Arm
28 Bearing point
29 Rotation axis
30 Chassis
31 Control arm
32 Strut
33 Strut
34 Attachment point
35 Attachment point
36 Body connection area
37 Arrow
38 Arrow
39 Control arm connection area
a Offset
E Plane
F Direction of travel
g Direction of gravity
x Transverse direction
y Vertical direction
z Depth direction
Z1 Sprung-out state
Z2 Sprung-in state
α Tilt angle

The invention claimed is:

1. A leaf spring device for a vehicle, comprising:
a leaf spring apparatus made of a fiber composite plastic,
a first bearing point provided at a first end section of the leaf spring apparatus for supporting the leaf spring device on the vehicle, the first bearing point comprising exactly three rotational degrees of freedom, and
a second bearing point provided at a second end section of the leaf spring apparatus facing away from the first end section for supporting the leaf spring device on the vehicle, the second bearing point comprising exactly one rotational degree of freedom.

2. The leaf spring device according to claim 1, characterized in that the first bearing point comprises one rotational degree of freedom about a vertical direction of the leaf spring apparatus, one rotational degree of freedom about a transverse direction of the leaf spring apparatus and one rotational degree of freedom about a depth direction of the leaf spring apparatus, wherein the vertical direction, the transverse direction and the depth direction are oriented perpendicular to each other.

3. The leaf spring device according to claim 2, characterized in that the exactly one rotational degree of freedom of the second bearing point is oriented about a rotation axis arranged perpendicularly or obliquely to the vertical direction.

4. The leaf spring device according to claim 1, characterized in that the first bearing point is a ball head of a ball joint.

5. The leaf spring device according to claim 4, characterized by a ball socket of the ball joint, wherein the first bearing point is received at least in sections in the ball socket.

6. The leaf spring device according to claim 5, characterized in that the first bearing point and/or the ball socket is plastic-coated.

7. The leaf spring device according to claim 1, characterized in that the second bearing point has a cylindrical geometry.

8. The leaf spring device according to claim 1, characterized by a first spring shoe attached to the first end section and comprising the first bearing point, and a second spring shoe attached to the second end section and comprising the second bearing point.

9. The leaf spring device according to claim 1, characterized in that the leaf spring apparatus is an integral component.

10. The leaf spring device according to claim 1, characterized in that the leaf spring apparatus comprises a plurality of leaf spring sections and a plurality of deflection sections, in each case one deflection section connecting two adjacent leaf spring sections to one another.

11. A chassis for a vehicle comprising at least one leaf spring device according to claim 1, a body connection area provided on the vehicle on which the first bearing point is supported, and a control arm comprising a control arm connection area on which the second bearing point is supported.

12. The chassis according to claim 11,
characterized in that the first bearing point is arranged above the second bearing point with respect to a direction of gravity.

13. The chassis according to claim 11,
characterized in that the control arm can be brought from a sprung-out state into a sprung-in state and vice versa, the control arm connection region tilting by a tilt angle when the control arm is brought from the sprung-out state into the sprung-in state, and the first bearing point compensating the tilt angle.

14. The chassis according to claim 13,
characterized in that the control arm connection area moves by an offset when the control arm is moved from the sprung-out state to the sprung-in state, the second bearing point compensating the offset.

15. A vehicle comprising a chassis according to claim 11.

16. The leaf spring device according to claim 6, wherein the first bearing point and/or the ball socket is plastic-coated with polytetrafluoroethylene.

17. A vehicle comprising a leaf spring device according to claim 1.

* * * * *